US009527710B1

(12) United States Patent
Hussain et al.

(10) Patent No.: US 9,527,710 B1
(45) Date of Patent: Dec. 27, 2016

(54) ENHANCED INVENTORY HOLDER

(71) Applicant: Amazon Technologies, Inc., Seattle, WA (US)

(72) Inventors: Mustafa Mustansir Hussain, Hyderabad (IN); Neeraj Goyal, Faridabad (IN); Venkataramanan Subramanian, Hyderabad (IN); Vikas Vishwanatham, Nizamabad (IN)

(73) Assignee: Amazon Technologies, Inc., Reno, NV (US)

( * ) Notice: Subject to any disclaimer, the term of this patent is extended or adjusted under 35 U.S.C. 154(b) by 19 days.

(21) Appl. No.: 14/743,866

(22) Filed: Jun. 18, 2015

Related U.S. Application Data

(63) Continuation of application No. 14/037,145, filed on Sep. 25, 2013, now Pat. No. 9,073,736.

(51) Int. Cl.
*G06F 7/00* (2006.01)
*B66F 9/06* (2006.01)

(52) U.S. Cl.
CPC ....... *B66F 9/063* (2013.01); *G05D 2201/0216* (2013.01)

(58) Field of Classification Search
None
See application file for complete search history.

(56) References Cited

U.S. PATENT DOCUMENTS

| 4,892,453 | A  | * | 1/1990  | Bantien ............... A24C 5/352 198/468.11 |
| 6,174,122 | B1 | * | 1/2001  | Krooss ............... B65B 69/0033 414/404 |
| 6,675,980 | B2 | * | 1/2004  | Ehrgott ............... A47F 5/0823 211/189 |
| 8,280,547 | B2 |   | 10/2012 | D'Andrea et al. |
| 2002/0147038 | A1 | * | 10/2002 | McLeod ............... A01D 41/04 460/12 |
| 2002/0174625 | A1 |   | 11/2002 | Smith, Jr. et al. |
| 2011/0005897 | A1 | * | 1/2011  | Schafer ............... B65G 47/244 198/401 |
| 2012/0065762 | A1 |   | 3/2012  | Pillarisetti |
| 2012/0143427 | A1 |   | 6/2012  | Hoffman et al. |

OTHER PUBLICATIONS

U.S. Appl. No. 14/037,145, filed Sep. 25, 2013, Titled: Enhanced Inventory Holder.

(Continued)

*Primary Examiner* — Yolanda Cumbess
(74) *Attorney, Agent, or Firm* — Kilpatrick Townsend & Stockton LLP

(57) ABSTRACT

Embodiments herein are directed to an inventory system having multiple inventory holders and drive units for moving the inventory holders. Features herein are directed to moving inventory items relative to a bin of an inventory holder or between inventory holders in the inventory system. The inventory system may include actuation units or some other mechanism on the drive units for assisting in moving inventory items relative to a bin of an inventory holder or between inventory holders. The inventory holders each include one or more inventory bins. A mobile drive unit is included, which includes an actuator configured for selectively actuating at least one of the inventory bins for moving at least one inventory item relative to the bin.

20 Claims, 12 Drawing Sheets

(56) References Cited

OTHER PUBLICATIONS

U.S. Appl. No. 14/037,145, "Final Office Action", mailed Jan. 5, 2015, 7 pages.
U.S. Appl. No. 14/037,145, "Non final office action", mailed Sep. 16, 2014, 9 pages.
U.S. Appl. No. 14/037,145, "Notice of Allowance", mailed Mar. 16, 2015, 6 pages.

* cited by examiner

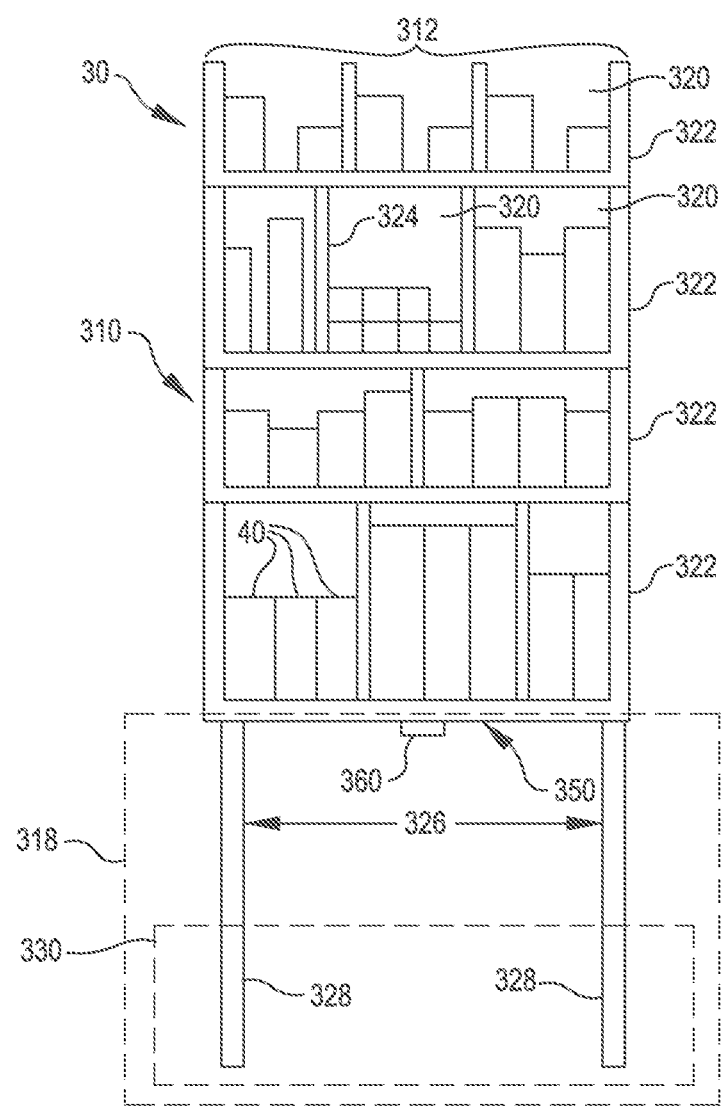

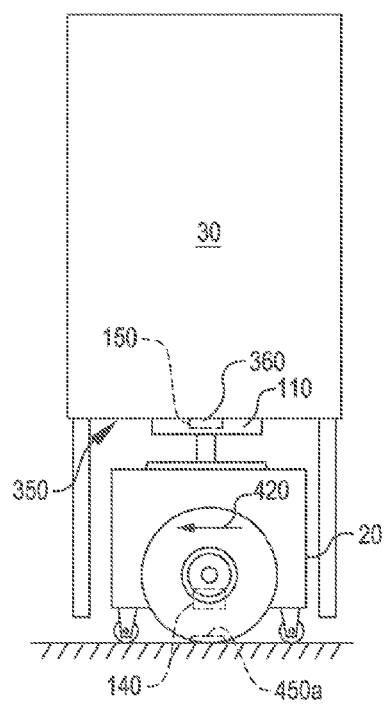
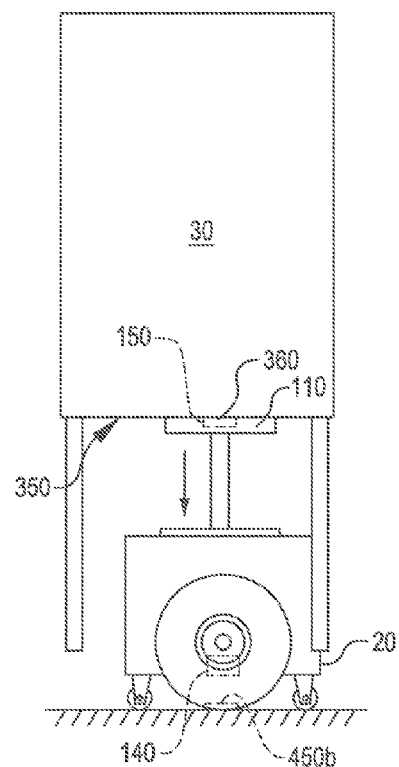
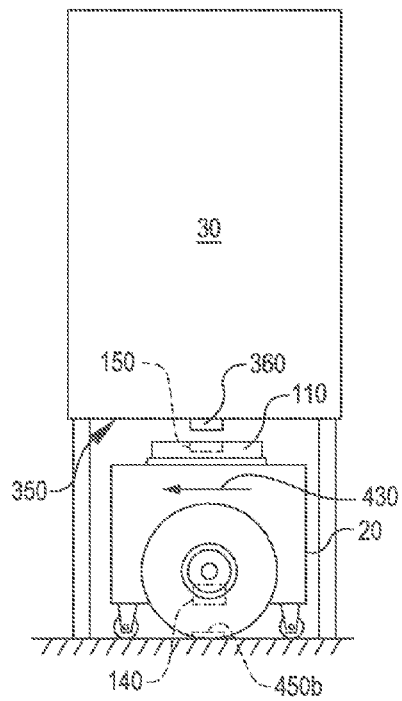

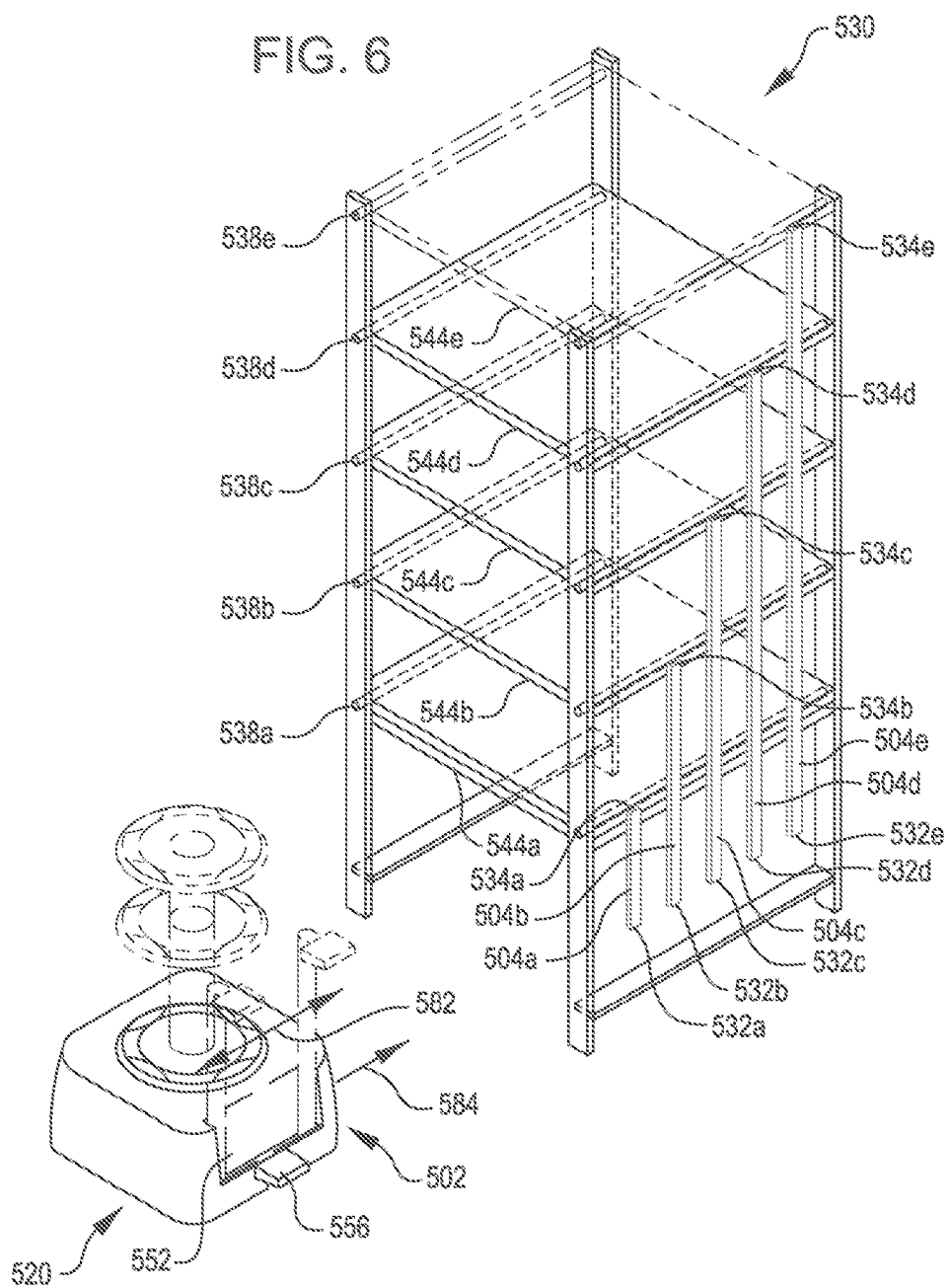

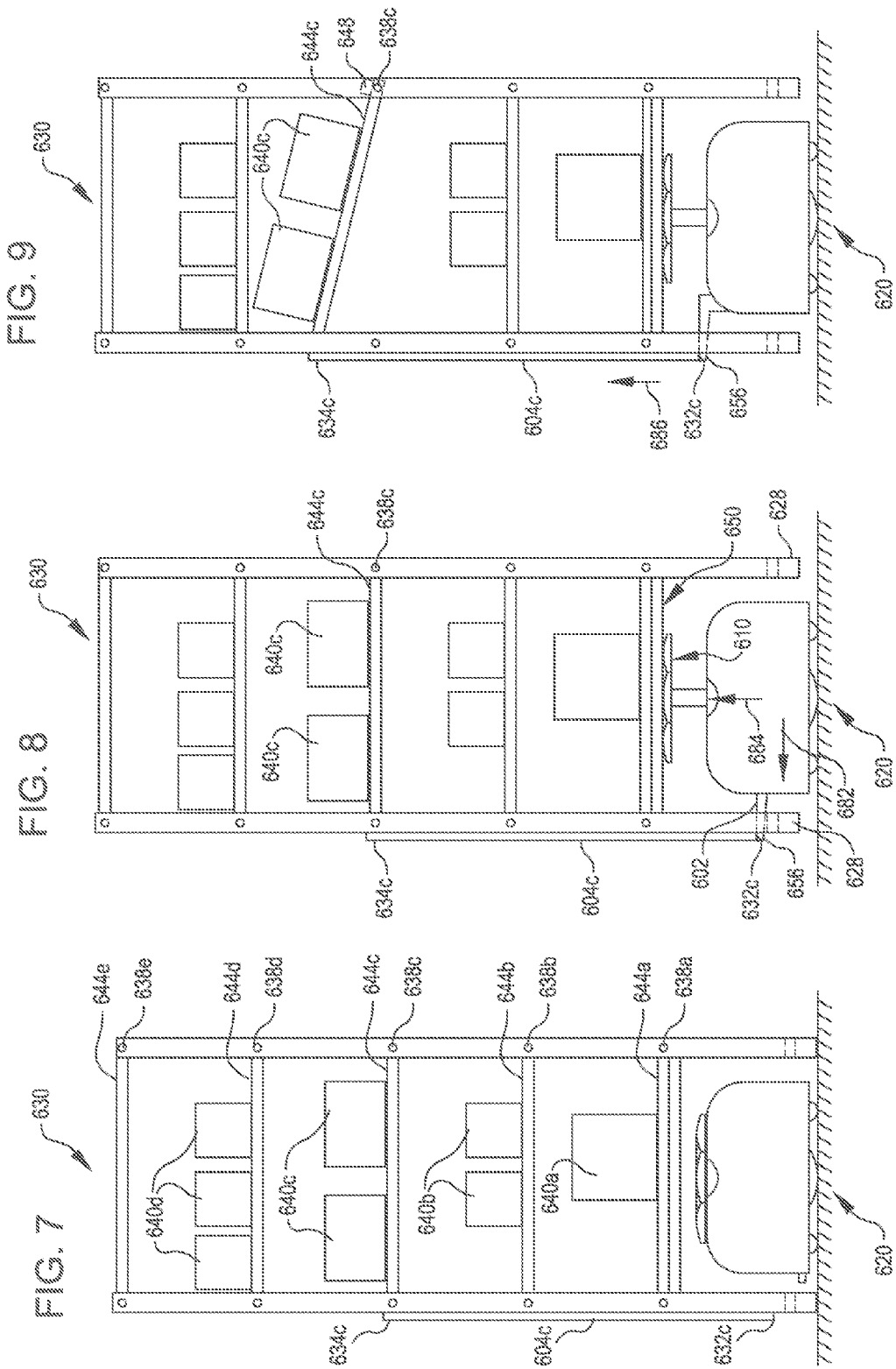

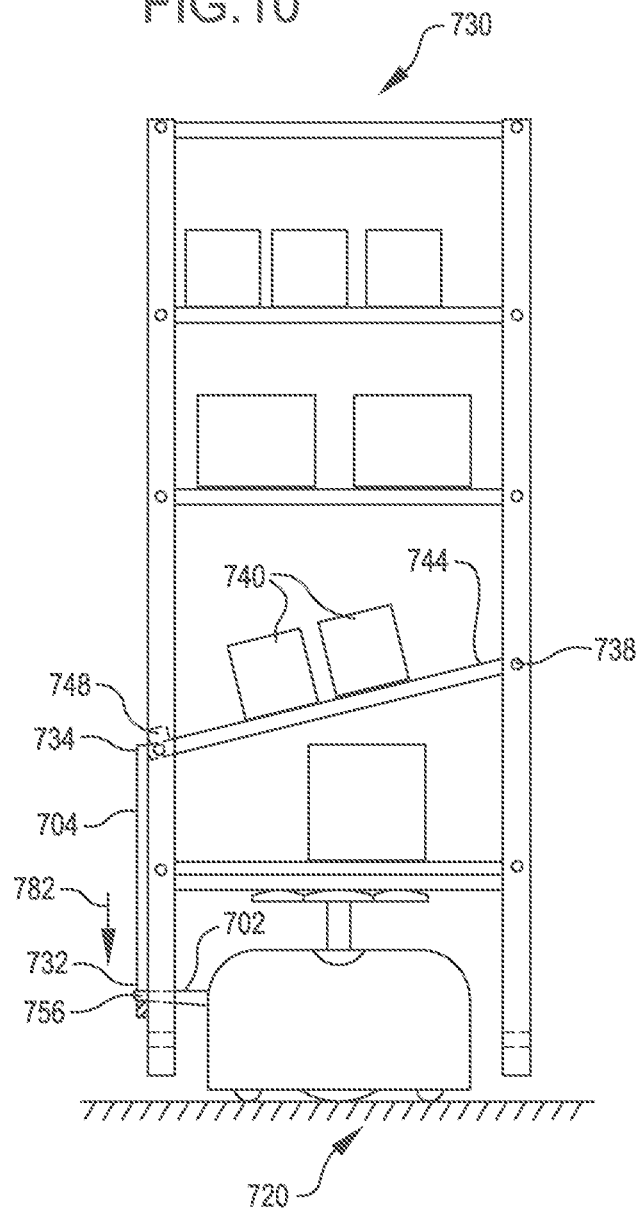

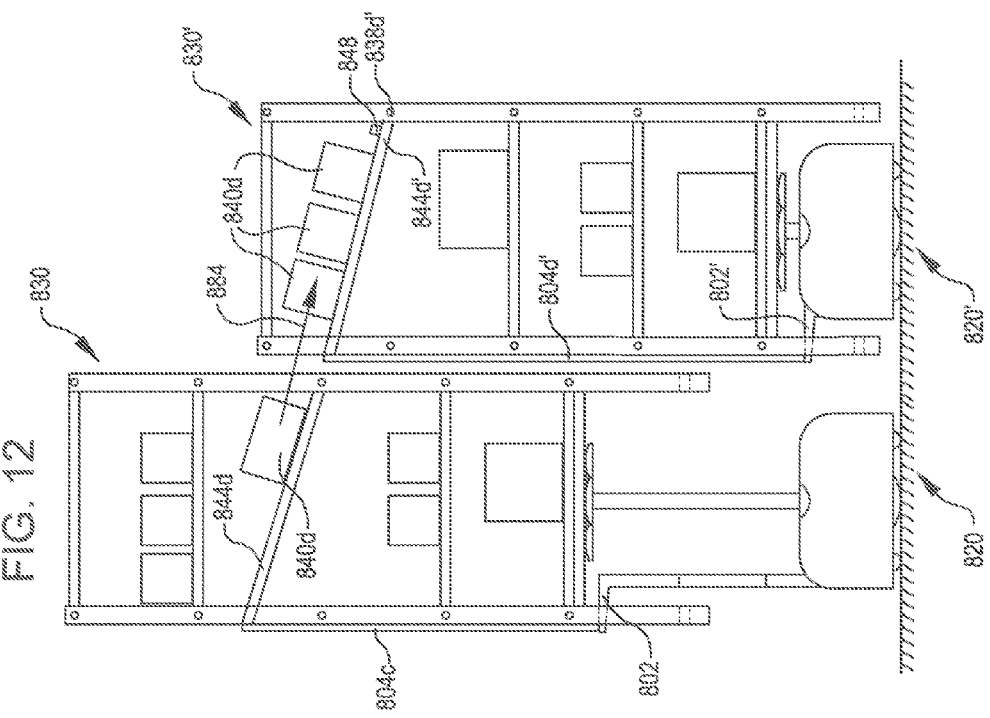
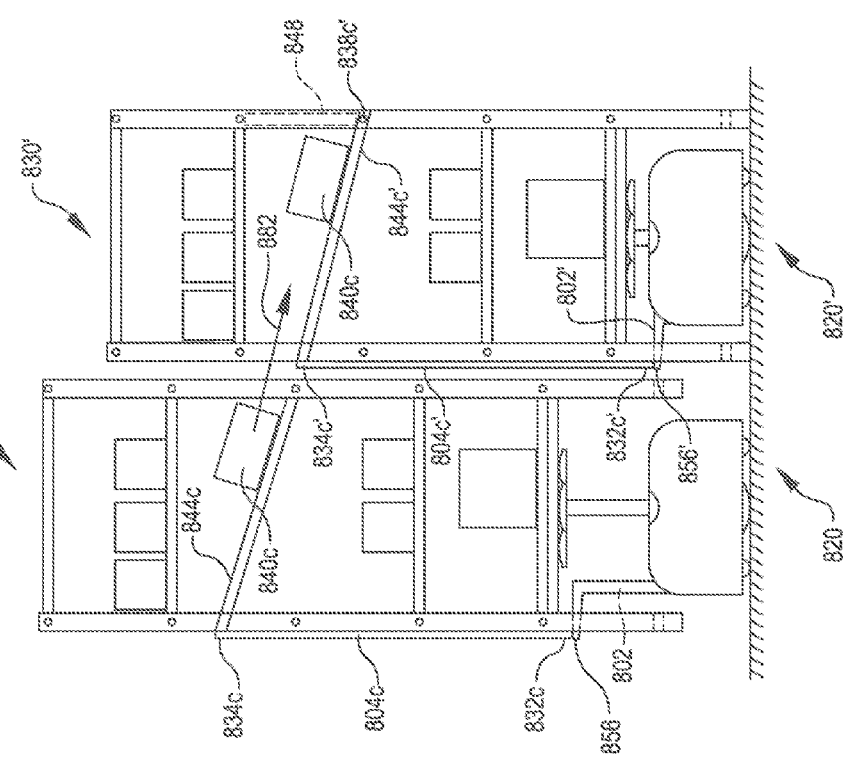

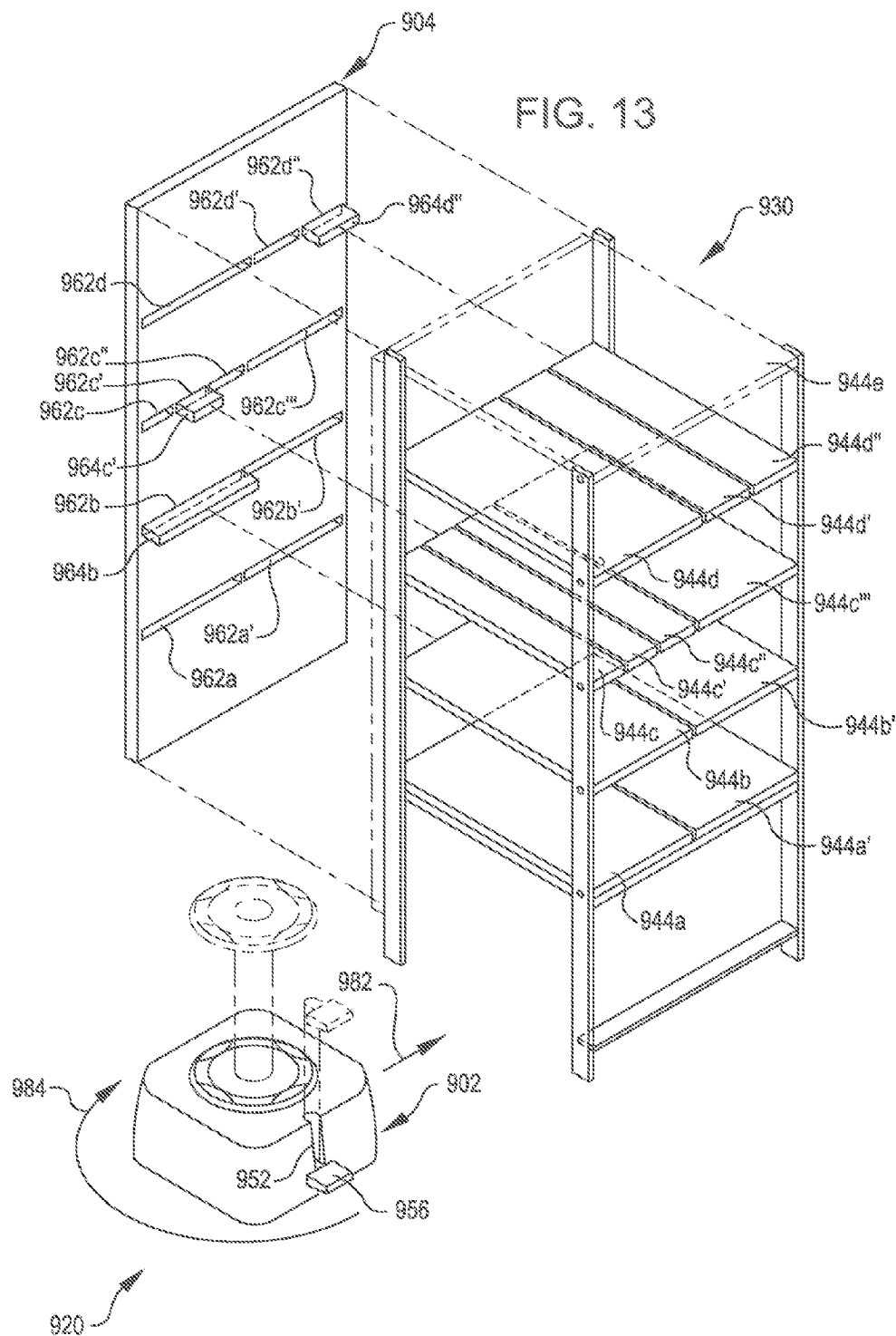

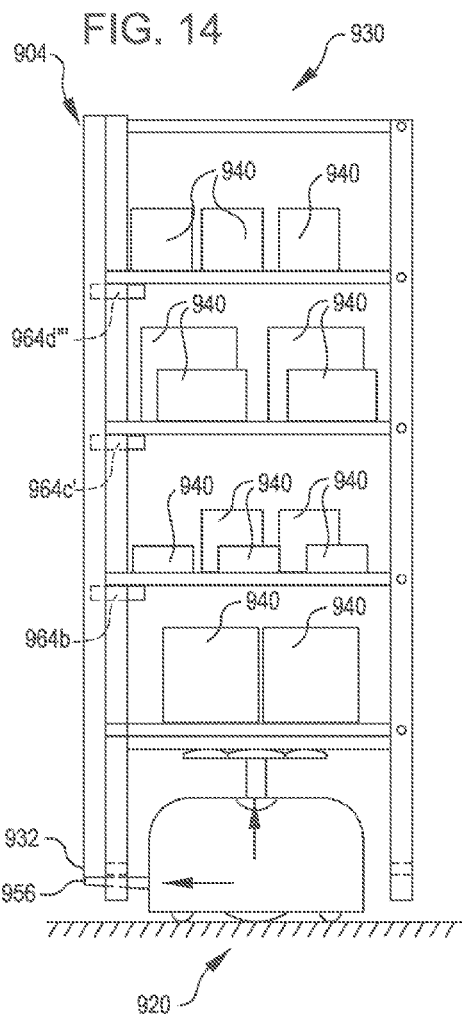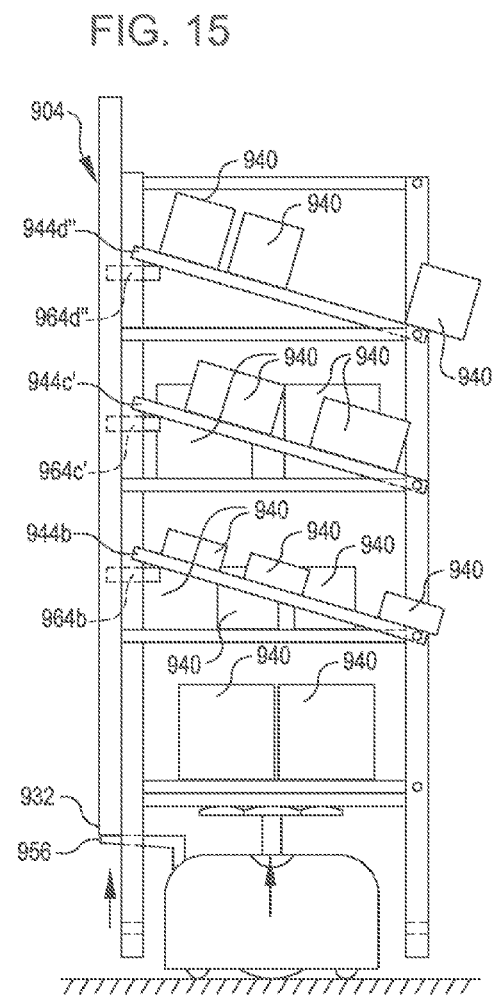

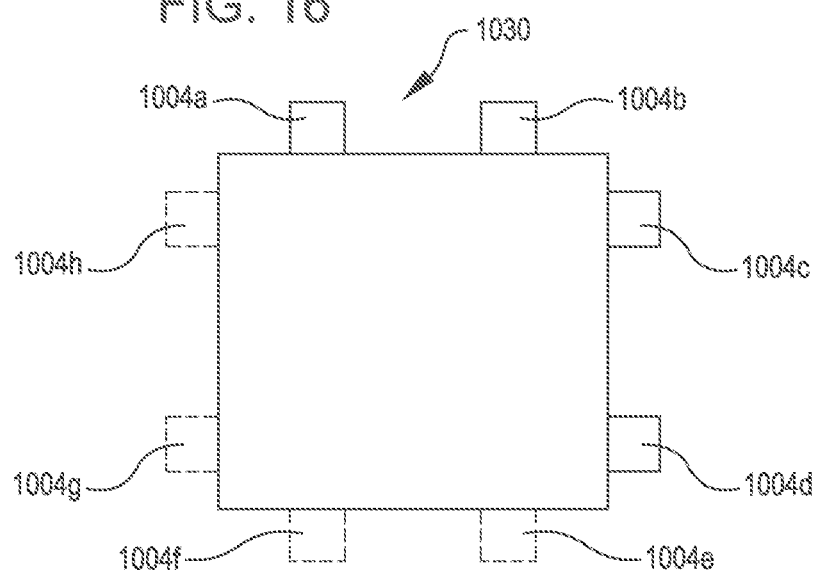
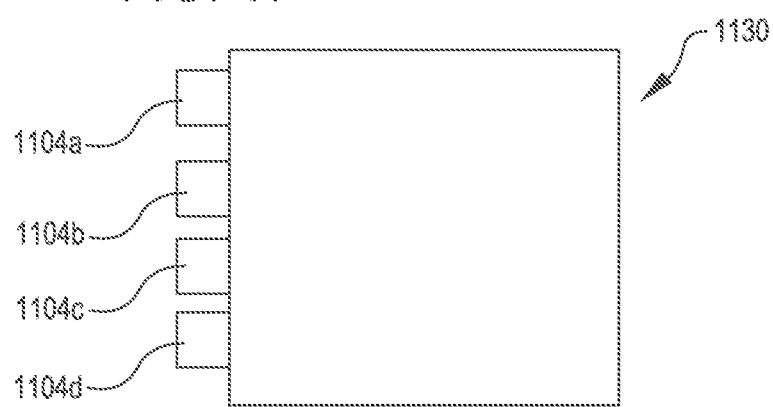

ENHANCED INVENTORY HOLDER

CROSS-REFERENCES TO RELATED APPLICATIONS

This application is a continuation of U.S. application Ser. No. 14/037,145, filed Sep. 25, 2013, which is incorporated herein by reference in its entirety for all purposes.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive limiting the ability of the system to accommodate fluctuations in system throughput.

BRIEF DESCRIPTION OF THE DRAWINGS

Various embodiments in accordance with the present disclosure will be described with reference to the drawings, in which:

FIG. 4 illustrates in greater detail an example inventory holder that may be utilized in particular embodiments of the inventory system shown in FIG. 1;

FIGS. 5A-5F show operation of various components of the mobile drive unit and the inventory holder during docking, movement and undocking;

FIG. 6 is a side perspective view of an inventory holder and mobile drive unit in accordance with embodiments;

FIG. 7 is a side view of the inventory holder and drive unit of FIG. 6, with the drive unit shown in the position prior to actuation;

FIG. 8 is a side view of the inventory holder and drive unit of FIG. 7, shown at the beginning of actuation;

FIG. 9 is a side view, similar to FIGS. 7 and 8, showing actuation of the inventory holder by the drive unit;

FIG. 10 shows an alternate embodiment wherein actuation occurs by a pulling movement downward;

FIG. 11 is a side view showing adjacent inventory holders where inventory items are moving from one inventory holder to an adjacent inventory holder;

FIG. 12 is a side view, similar to FIG. 11, showing movement of inventory items between adjacent inventory holders where the inventory items are disposed at different heights;

FIG. 13 is an exploded perspective view showing an alternate embodiment of an inventory holder and drive unit in accordance with embodiments;

FIG. 14 is a side view of the inventory holder and drive unit of FIG. 13 shown just prior to actuation;

FIG. 15 is a side view, similar to FIG. 14, showing actuation of the inventory holder by the drive unit;

FIG. 16 is a top plan view showing an embodiment of an inventory holder with multiple linkages; and FIG. 17 is a top plan view, similar to FIG. 16, wherein multiple linkages are included on the inventory holder, with all the linkages on one side.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. Specifically, features herein are directed to moving inventory items between inventory holders in the inventory system. To this end, the inventory system may include actuation units or some other mechanism on the drive units for assisting in moving inventory items between one inventory holder and another.

In accordance with an embodiment, a plurality of inventory holders are utilized in the inventory system. The inventory holders each include a plurality of inventory bins. Each of the bins includes a linkage associated with the bin. A mobile drive unit is utilized for moving the inventory holders around the inventory system. In addition, the mobile drive unit includes an actuator that is configured for selectively actuating at least one linkage to cause the bin associated with the linkage to tilt the bin to move inventory out of the bin.

In embodiments, moving inventory out of the bin can include moving the inventory out of the bin into a bin of another inventory holder. In additional embodiments, the inventory holder can be moved, for example, up or sideways to properly align bins on adjacent inventory holders.

Actuation of the linkage can include pushing, pulling, rotating, or any other movement translated through the linkage to cause tilting of the bin.

In accordance with additional embodiments, an inventory system is provided having a plurality of inventory holders, each of which includes one or more inventory bins. A mobile drive unit is included, which includes an actuator configured for selectively actuating at least one of the inventory bins for moving at least one inventory item relative to the bin.

Additional embodiments are directed to a method for moving inventory items in an inventory system. The method may include utilizing a drive unit configured to move inventory holders within the inventory work space of the inventory system to shift a bin on a first inventory holder to cause at least one inventory item to move from the bin to a second inventory holder.

Figure 1:
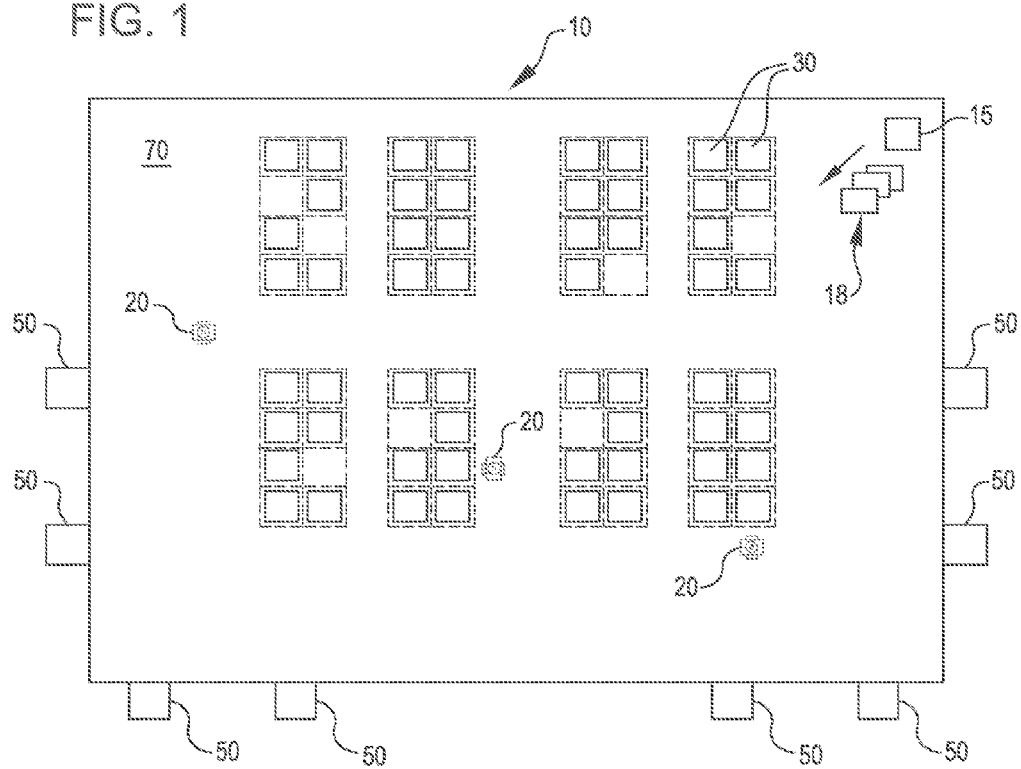
FIG. 1 illustrates components of an inventory system according to a particular embodiment.

FIG. 1 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 1 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 2.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 3A and 3B.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g., from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 1 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 1 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 2:
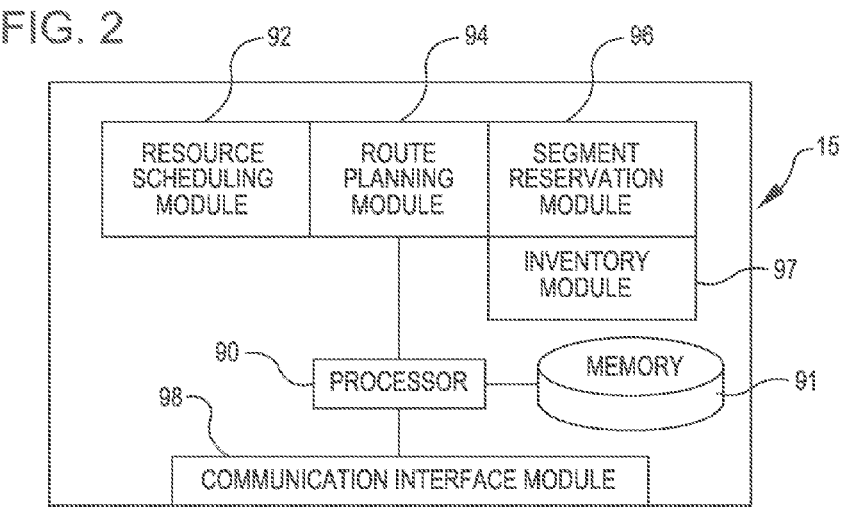
FIG. 2 illustrates in greater detail the components of an example management module that may be utilized in particular embodiments of the inventory system shown in FIG. 1.

FIG. 2 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10. As an example, as described in more detail below, the inventory module 97 can instruct a mobile drive unit 20 to move inventory items 40 between adjacent inventory holders 30. As part of this task assignment 18, the mobile drive unit 20 may be instructed by the inventory module 97 to move two inventory holders 30, or to move one inventory to a position adjacent to another inventory holder, so that the movement of inventory items between the adjacent inventory holders can take place.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 3A:
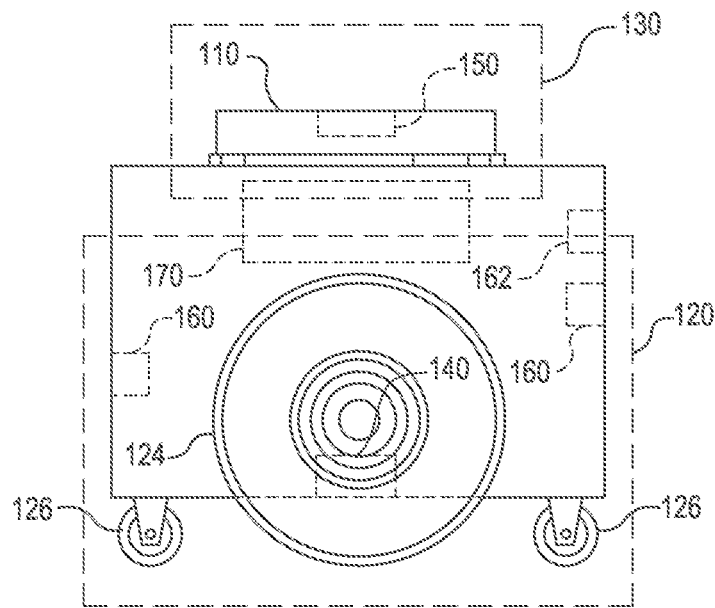
FIGS. 3A and 3B illustrate in greater detail an example mobile drive unit that may be utilized in particular embodiments of the inventory system shown in FIG. 1.
Figure 3B:
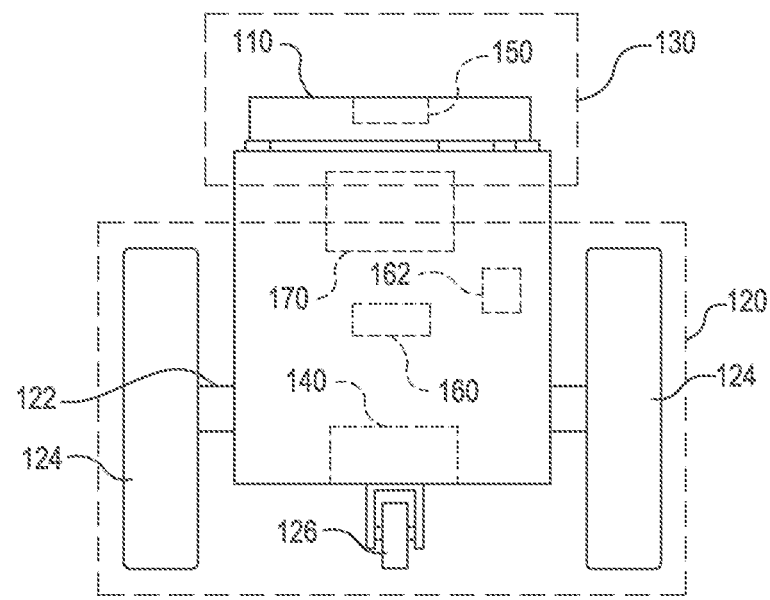

FIGS. 3A and 3B illustrate in greater detail the components of a particular embodiment of mobile drive unit 20. In particular, FIGS. 3A and 3B include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel drive module 120. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speed from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 3A and 3B illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

FIG. 4 illustrates in greater detail the components of a particular embodiment of inventory holder 30. In particular, FIG. 4 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks 450. Mobile drive unit 20 may be configured to detect fiducial marks 450 and to determine the location of mobile drive unit 20 and/or measure its movement based on the detection of fiducial marks 450.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 40. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 5A-5H illustrate operation of particular embodiments of mobile drive unit 20 and inventory holder 30 during docking, movement, and undocking.

Figure 5A:
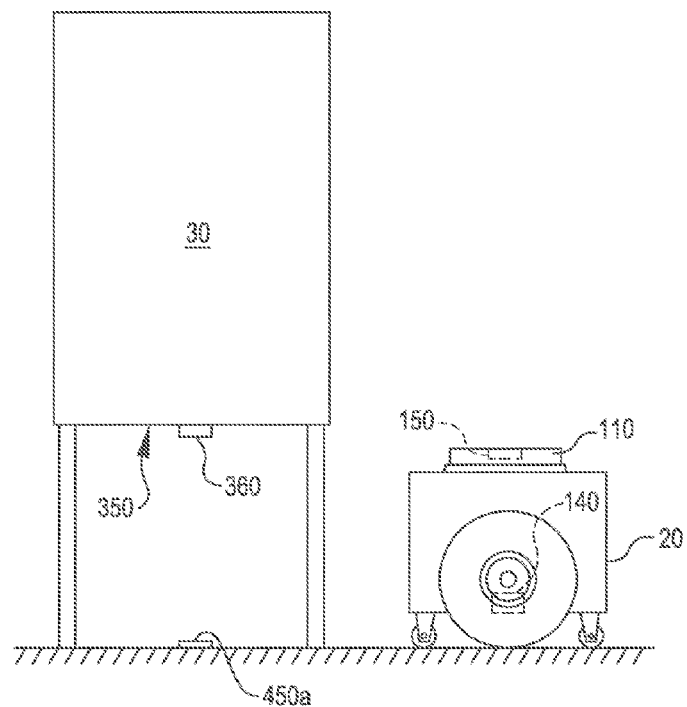

FIG. 5A illustrates mobile drive unit 20 and inventory holder 30 prior to docking. As noted above with respect to FIG. 1, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 5A shows mobile drive unit 20 and inventory holder 30 as mobile drive unit 20 approaches the storage location identified by the received command. In the illustrated embodiment, the reference point is marked by fiducial mark 450a which comprises a surface operable to reflect light and which, as a result, can be detected by particular embodiments of position sensor 140 when mobile drive unit 20 is positioned over or approximately over fiducial mark 450a. As noted above, the illustrated embodiment of mobile drive unit 20 utilizes optical sensors, including a camera and appropriate image- and/or video processing components, to detect fiducial marks 450.

Figure 5B:
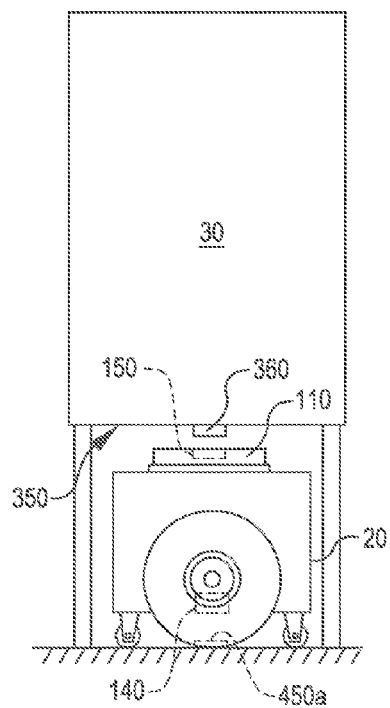

FIG. 5B illustrates mobile drive unit 20 and inventory holder 30 once mobile drive unit 20 reaches fiducial mark 450a. Because, in the illustrated example, fiducial mark 450a marks the location of the reference point to which mobile drive unit 20 is destined, mobile drive unit 20 begins the docking process once mobile drive unit 20 reaches fiducial mark 450a. In the illustrated example, mobile drive unit 20 is configured to dock with inventory holder 30 from a position beneath inventory holder 30 and, as a result, inventory holder 30 is stored so that docking surface 350 is located directly above fiducial mark 450a.

Figure 5C:
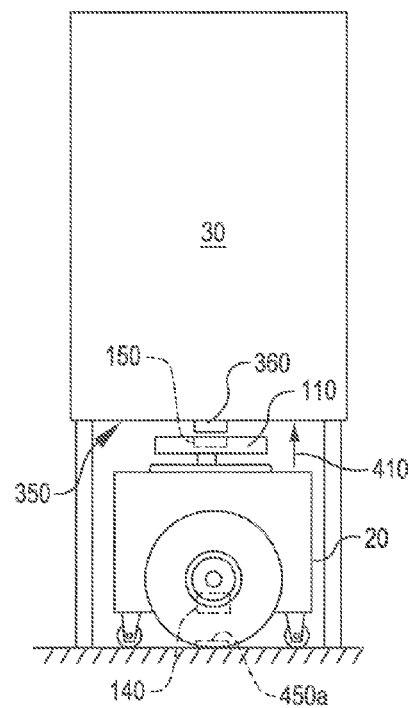

FIG. 5C illustrates operation of mobile drive unit 20 in docking with inventory holder 30. After positioning itself over fiducial mark 450a, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

FIG. 5D illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

FIG. 5E illustrates mobile drive unit 20 and inventory holder 30 when the two components arrive at an appropriate point for undocking. As noted above, this may represent a final destination specified by the original command, the original storage location for inventory holder 30, or any other point within the workspace. At or near the destination, mobile drive unit 20 may detect another fiducial mark 450, fiducial mark 450b, associated with the undocking location. Mobile drive unit 20 determines its location based on fiducial mark 450b and, as a result, determines that it has reached the undocking location. After determining that it has reached the undocking location, mobile drive unit 20 initiates an appropriate undocking process based on the configuration and characteristics of mobile drive unit 20 and inventory holder 30.

FIG. 5F illustrates a mobile drive unit 20 and inventory holder 30 subsequent to undocking. Mobile drive unit 20 may then move away from inventory holder 30 and begin responding to other commands received by mobile drive unit 20.

As described above, embodiments herein are directed to movement of inventory items 40 between inventory holders 30. In accordance with some embodiments, the mobile drive units 20 are utilized to perform the function of initiating and causing the movement of inventory items 40 between the adjacent inventory holders 30.

FIG. 6 illustrates an embodiment of a mobile drive unit 520 and inventory holder 530 in accordance with embodiments, wherein the mobile drive unit 520 is configured to cause movement of inventory items 40 (not shown in FIG. 6) within and/or out of the inventory holder 530. To this end, the mobile drive unit includes an actuating mechanism, the actuation of which causes some movement within the inventory holder, such as tilting of one of the bins in the inventory holder.

In FIG. 6, the mobile drive unit 520 includes a bin tilting actuator 502 that engages linkages 504 (indicated as 504a, 504b, 504c, 504d, 504e in FIG. 6). Although five linkages 504 are shown in FIG. 6, four or less linkages or six or more linkages could be used on a particular inventory holder 530.

In general, the bin tilting actuator 502 engages one of the linkages 504 to cause a translation movement to one of the bins on the inventory holder 530. The linkages 504 include engagement surfaces 532a-532e at lower ends of the tilting linkages. Opposite, connection ends 534a-534e are connected to one side of inventory bins 544a-544e. In the embodiment shown in FIG. 6, the inventory bins 544 are rotatably mounted with rotatable mounts 538a-538e to the inventory holder and are loosely mounted at the opposite end where the connection ends 534a-534e are attached.

In general, the bin tilting actuator 502 engages one of the engagement surfaces 532 to cause the corresponding inventory bin 544 to tilt, moving the inventory items 40 (not shown) within and/or out of the respective bin. In the embodiment shown in FIG. 6, the bin tilting actuator 502 includes a pushing mechanism to provide this function. The pushing mechanism 552 is able to locate a pusher 556 so as to engage the appropriate engagement surface 532 to then drive that engagement surface and the associated linkage 504 upward. This movement upward causes tilting of the corresponding bin 544.

In embodiments, the inventory module 97 instructs the appropriate mobile drive unit 520 to cause movement of inventory items between inventory holders 530. As part of the task assignment 18, provided by the inventory module 97, the drive unit 520 aligns adjacent inventory holders if needed. Then, the drive unit 520 is positioned below one of the inventory holders 530, as is shown in FIG. 7, below. The pushing mechanism 552 can then align the pusher 556 with the appropriate engagement surface 532 of a bin tilting linkage 504. In embodiments, such as in the embodiment shown in FIG. 6, the pusher 556 can move laterally, as indicated by the bidirectional arrow 582, so as to align with the appropriate bin tilting linkage 504 after the mobile drive unit 520 is in place. As an alternative to permitting lateral movement of the pusher 556, the entire mobile drive unit 520 can be moved laterally so as to properly align the pusher 556. However, in embodiments, the mobile drive unit 520 will be positioned in a similar location as the docking position used to lift and/or rotate an inventory holder 530. Also, the drive unit 520 may have the inventory holder 530 lifted while the bin tilting actuator 502 is moving inventory items 40 from an inventory bin 544.

FIGS. 7-9 show side views of a series of actions for movement of inventory items on an inventory holder 630. In embodiments, the inventory holder 630, shown in FIGS. 7-9 can be identical to the inventory holder 530 or can include different actuators or other components than are shown or are described with respect to FIG. 6. A mobile drive unit 620 is shown in FIGS. 7-9 in a docking position. Again, this mobile drive unit 620 may be configured and may operate similar to the mobile drive unit 520 described with reference to FIG. 6. Like the mobile drive unit 520, the mobile drive unit 620 includes a bin tilting actuator 602 that drives a pushing mechanism 652 through translating movement into engagement with bin tilting linkages 604. The pushing mechanism 652, shown in FIGS. 7-9, includes a pusher 656 similar to the pusher 556 in FIG. 6. The linkages 604 include engagement surfaces 632 and connection ends 634 that are similarly named structures in FIG. 6. For simplicity's sake, only one linkage 604, the linkage 604c, is shown in FIGS. 7-9. However, in embodiments, multiple linkages can be provided, such as the linkages shown in FIG. 6.

Also, as with embodiment described with FIG. 6, each of the inventory bins 644 includes a rotatable mount 638 at one end opposite the end of the inventory bin 644 that is attached to the connection end 634 of the bin tilting linkage 604.

Although shown at opposite ends and described in the current embodiment as attached to opposite ends of the bin, the rotatable mount and/or the connection end can be removed from the distal ends of the inventory bin. The linkage can be connected to any location, so that translation of the linkage causes tilting of the associated bin.

In the embodiments shown in FIGS. 7-9, the bin tilting actuator 602 causes movement of the appropriate bins 644 to move inventory items 640 along the inventory bin 644 and to one side of the bin 644. To this end, an item stopper 648 is provided on the rotatable mount side of the bin 644. This item stopper 648 is positioned so that it stops movement of an inventory item 640 when the inventory item 640 engages the item stopper 648. Thus, the bin tilting actuator 602 drives the tilting linkage 604 to cause the bin 644 to tilt, and the inventory items 640 on that bin 644 slide down and engage and stop against the item stopper 648. The item stopper 648 can be a block, a railing, a wall extending to adjacent bins, a fully closed side of the inventory holder, or any other structure with size or shape suitable for the purpose of restraining movement of the inventory items 640. This movement can advantageously situation inventory items on the inventory bin 644 for easy access by a worker and/or for permitting additional inventory items to be added to the particular bin. In some embodiments, the item stopper 648 can be omitted or selectively operated to allow one or more inventory items 640 to move out of the bin 644. For example, an inventory item 640 may move out of the bin 644 and onto a second inventory holder, a conveyor, a shipping container, a packaging for the inventory item 640, a table, a truck, a pallet, or another surface for managing the position, location, or use of the inventory item 640.

The action of moving inventory items 640, utilizing the mobile drive unit 620, shown in FIGS. 7-9, follows from the description above. Initially, the mobile drive unit 620 is moved into a docking position so that the docking head 610 of the mobile drive unit is positioned below a docking surface 650 of the inventory holder 630. The docking head 610 is then driven upward, as shown by the arrow 684, so as to stabilize and hold the inventory holder 630 in position. In this movement, the docking head 610 may move upward a sufficient amount to lift legs 628 of the inventory holder 630 off the ground, or may simply engage the docking surface 650. If the inventory holder 630 needs to be lifted to a particular height for a function, such as movement of inventory items between adjacent inventory holders, then the legs 628 are lifted off the ground the appropriate amount. When the mobile drive unit 620 is docked below the inventory holder 630, in embodiments, the pusher 656 is positioned laterally, or to the left, in FIGS. 7-9, in a position that is appropriate to engage the bottoms of the engagement surfaces 632. However, in an alternate embodiment, the pusher 656 may move radially relative to the mobile drive unit 620, as indicated by the leftward arrow 682 in FIG. 8, so that the pusher 656 can properly align underneath one of the engagement surfaces 632. As described with reference to FIG. 6, the pusher 656 can also be moved laterally, in and out of the drawing, so as to align under the appropriate bin tilting linkage 604.

Once the pusher 656 is properly aligned, then the bin tilting actuator 602 drives the pusher upward, as shown by the arrow 686, translating the linkage 604c to cause the bin 644c to tilt. This tilting continues until the slope of the bin 644c is sufficient for inventory items 640c to slide sideways, in FIG. 9 to the right. As described above, this sliding movement can occur until the inventory items 640 engage the item stopper 648. In this manner, inventory items 640 can be situated, moved, or arranged by the mobile drive unit 620 through instructions provided by the inventory module 97.

FIG. 10 shows an alternate embodiment where a mobile drive unit 720 includes a bin tilting actuator 702 that pulls downward on a bin tilting linkage 704 instead of pushing upward on the linkage as in previous embodiments. To this end, engagement surfaces 732 for a particular linkage 704 may include an opening, shelf, groove, or any other surface that can be engaged by and pushed downward by a puller 756 on the bin tilting actuator.

In operation, the mobile drive unit 720 docks below the inventory holder 730. The puller 756 is moved into engagement with the engagement surface 732. The puller is then driven downward so as to cause an end of the inventory bin 744 to move downward. This movement of the inventory bin 744 downward may be against the bias of the spring, or some unlocking mechanism may be actuated as part of the movement downward by the puller 756. As the linkage 704 and the end of the inventory bin 744 are moved downward, the items 740 on the inventory bin 744 move to the left in FIG. 10. These items can be moved off the bin, or can be moved into a position against an item stopper 748, such as is described above.

As described previously, the systems and methods described herein can be utilized to move inventory items within an inventory holder, or from one inventory holder to another inventory holder. FIGS. 11 and 12 show embodiments where inventory items are moved from one inventory holder to another.

During a movement process, when a bin is tilted, shifted, or otherwise moved to allow movement of the inventory items into another bin, the receiving bin can be tilted or can remain in its normal state. In the embodiments shown in FIGS. 11 and 12, the receiving bin is tilted so that a smooth transition occurs for the moving inventory items when those moving inventory items move from a first inventory holder to a second inventory holder.

In FIGS. 11 and 12, inventory items are moved from a bin that is the same height as the adjacent bin onto which it is being moved (FIG. 11) and onto a bin that is higher than the bin from which it is moved (FIG. 12).

To this end, in FIG. 11, a transferring bin 844c on a transferring inventory holder 830 (to the left in FIG. 11) is tilted by the bin tilting actuator 802c while the inventory holder 830 is raised from a floor. In the embodiments shown in FIG. 11, the transferring inventory holder 830 is raised high enough so that a leading edge of the inventory bin 844c is aligned above a trailing edge of an inventory bin 844c' for a right inventory holder 830'. Similarly, in FIG. 12, the leading edge of an inventory bin 844d is raised to a sufficient height so that inventory items 840d on the inventory bin can slide downward and onto a receiving inventory bin 844d' on an adjacent inventory holder 830'. The leading edge of the receiving inventory bin 844d' can be lowered at an appropriate rate so as to prevent the inventory items 840d from continuing to slide out of the receiving inventory bin 844d'. In alternative or additional embodiments, inventory items 840d may be prevented from sliding out of the receiving inventory bin 844d' by an item stopper 848 as described above. Although the item stopper 848 is depicted in FIG. 11 as a wall extending between vertically adjacent bins and is alternatively depicted in FIG. 12 as a block, the item stopper 848 can also be a railing, a wall extending to horizontally adjacent bins, a fully closed side of the inventory holder, or any other structure with size or shape suitable for the purpose of restraining movement of the inventory items 840.

As can be understood, in the examples shown in FIGS. 11 and 12, the inventory holders on the left or right can be raised or lowered as needed so as to align the transferring and receiving bins. In this manner, inventory can be transferred between two holders into the desired bins. This operation can be repeated throughout the inventory system 10 so that inventory items can be consolidated within the inventory system. Additionally, while FIGS. 11 and 12 depict individual mobile drive units performing both functions of lifting the inventory holder and tilting the appropriate bin or bins, multiple mobile drive units may operate cooperatively to provide the combination of lifting and tilting functions. As a non-limiting example, a first mobile drive unit may lift the inventory holder, and a second mobile drive unit may cause the appropriate bin to tilt.

FIGS. 13-15 are directed to an alternate embodiment utilizing a linkage system that can selectively engage an appropriate bin for tilting or other movement of the bin. For example, as shown in FIG. 13, a single level or tray may include multiple bins. These multiple bins can be engaged by a bin tilting linkage 904 having multiple channels 962 with retractable elements 964. The retractable elements 964 can be moved into position to engage an appropriate bin 944, or retracted entirely so that no bins on a particular level are tilted during actuation. As an example, on a second level of the bin tilting linkage 904, a retractable element 964b is selectively retractable or extendable so that the retractable element can engage or not engage a bin 944b. As a second example, a retractable element 964c' is selectively retractable or extendable to engage or not engage a bin 944c'. Retraction of the retractable elements can be caused by solenoids, linkages or other mechanical or electrical structures or elements. Although the system is depicted in FIG. 13 as utilizing a mobile drive unit 920 including a pusher 956 that is fixed laterally for translation up and down, any suitable drive unit—including, but not limited to, the mobile drive unit 520 depicted in FIG. 6—capable of engaging the linkage system may be utilized. The linkage 904 can be utilized to tilt one or more bins on a single actuation. To this end, the bin tilting actuator 902 on the mobile drive unit 920 engages the bin tilting linkage 904, which is shaped and is of sufficient size so that elements on the linkage can selectively engage each of the bins on the inventory holder. As can be understood, a similar bin tilting linkage can be provided that can selectively engage multiple bins, but not necessarily all of the bins on an inventory holder.

Operation of the bin tilting actuator 902 and the bin tilting linkage 904 is shown in FIGS. 14 and 15. As previously described, the mobile drive unit 920 is first docked at the inventory holder 930. The mobile drive unit 920 may or may not lift the inventory holder 930, but, in embodiments, at least engages the inventory holder 930 to stabilize it during the transfer of inventory items 940.

The retractable elements 964 are then suitably actuated. This can come from movement created by the pusher 956, an electrical signal sent by the mobile drive unit 920, or some other action or structure. In the embodiments shown in the drawings, retractable elements 964b, 964c', and 964d''' are extended so as to engage the associated bins 944b, 944c', and 944d'''. When the pusher 956 is driven upward in FIG. 15, these retractable elements 964 drive the trailing ends of the associated inventory bins 944 upward, causing the inventory items 940 on these bins to move relative to the bins. This action can be used to move the inventory items or to transfer the inventory items off of the inventory holder 930.

As can be understood, a number of different linkages can be utilized on the inventory holders. In additional alternate embodiments, the bin tilting actuator on a mobile drive unit 920 may directly engage or selectively directly engage the bins that are to be tilted. In additional alternate embodiments, linkages may be configured such that a docking actuator 130 of a mobile drive unit can directly engage or selectively directly engage the linkages of the bins that are to be tilted. Also, in additional alternate embodiments, actuation can be provided by mechanisms that are mounted on the inventory holders 930. However, such alternate embodiments could be more expensive to implement due to the fact that there are typically far more inventory holders than there are mobile drive units 920 in the inventory system 10. However, the scope of this disclosure also encompasses mechanisms that could be actuated remotely or by a mobile drive unit so as to provide movement of inventory items within an inventory holder.

In the embodiments shown in FIGS. 6-15, the linkages are arranged on a single side of an inventory holder. However, as shown in FIG. 16, linkages 1004 could be arranged around multiple sides, or even all sides of an inventory holder 1130. These linkages 1004 could be engaged by a pusher or other bin tilting actuator mechanism that is selectively moveable about the mobile drive unit, or the mobile drive unit could be rotated to align the pusher to a desired linkage or linkage set. Alternatively, as shown in FIG. 17, in accordance with embodiments, all linkages 1104 for a particular system could be located on one side of an inventory holder 1130.

As can be understood from the above, the bin tilting actuating systems described herein can be utilized to move inventory items within a single inventory holder, or move inventory items between inventory holders. This bin tilting system can thus be used to selectively arrange inventory items on a particular bin so that the bin can receive additional items from an adjacent inventory holder. The inventory items can therefore be moved by mobile drive units, especially where those mobile drive units are not currently being used for moving inventory holders throughout the inventory system 10. As such, consolidation of inventory items can occur as a background action in an inventory system 10. An inventory module 97 can be programmed to cause this consolidation to occur as it detects drive units are available. Thus, mobile drive units are efficiently used through the system so that inventory holders are moved to inventory stations or inventory items are consolidated as needed. Included in this consolidation process is the fact that two inventory holders could pass inventory items back and forth to each other until the inventory items are arranged in a desired manner.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method for transporting inventory items, the method comprising:
    supporting an inventory bin via a frame, the inventory bin having a linkage associated therewith, the linkage including a first end connected with the inventory bin and a second end having an engagement surface;
    using a mobile drive unit to move the frame to another location within an inventory workspace; and
    engaging the engagement surface via an actuator included in the mobile drive unit to actuate the linkage to tilt the inventory bin relative to the frame to move one or more inventory items out of the inventory bin.

2. The method of claim 1, wherein engaging the engagement surface comprises pushing on the engagement surface via an element drivingly coupled with the actuator.

3. The method of claim 1, wherein engaging the engagement surface raises at least one element of the linkage.

4. The method of claim 1, wherein at least one element of the linkage is pulled via the actuator.

5. The method of claim 1, wherein engaging the engagement surface lowers at least one element of the linkage.

6. The method of claim 1, wherein tilting the bin comprises lifting a first end of the inventory bin to cause the inventory bin to rotate about a second end of the inventory bin opposite the first end.

7. The method of claim 1, further comprising:
    supporting a second inventory bin via the frame, the second inventory bin having a second linkage associated therewith; and
    engaging the second linkage via the actuator to actuate the second linkage to tilt the second inventory bin relative to the frame to move one or more inventory items out of the second inventory bin.

8. The method of claim 1, further comprising tilting a plurality of inventory bins relative to the frame via a single actuation of the actuator.

9. A system for transporting inventory items, the system comprising:
    a plurality of inventory holders, each inventory holder of the plurality comprising one or more inventory bins; and
    at least one mobile drive unit comprising an actuator configured for selectively actuating at least one of the inventory bins for moving at least one inventory item relative to said at least one of the inventory bins, wherein the plurality of inventory holders comprises at least a sending inventory holder and a receiving inventory holder, wherein the sending inventory holder is configured to move at least one inventory item from a sending inventory bin of the sending inventory holder to the receiving inventory holder in response to actuation of the sending inventory bin.

10. The system for transporting inventory items of claim 9, wherein actuating the sending inventory bin comprises vertically moving a first part of the sending inventory bin to cause the sending inventory bin to rotate about an axis.

11. The system for transporting inventory items of claim 9, further comprising at least one linkage selectively arrangeable to engage different inventory bins.

12. The system for transporting inventory items of claim 9, further comprising at least one linkage selectively arrangeable to engage multiple inventory bins.

13. The system for transporting inventory items of claim 9, wherein the at least one mobile drive unit is configured to lift the sending inventory holder to align the sending inventory bin with a receiving inventory bin of the receiving inventory holder configured to receive the inventory item from the sending inventory bin.

14. The system for transporting inventory items of claim 9, wherein the at least one mobile drive unit is configured to lift the receiving inventory holder to align the sending inventory bin with a receiving inventory bin of the receiving inventory holder configured to receive the inventory item from the sending inventory bin.

15. A method for transporting inventory items, the method comprising:

supporting an inventory bin via a frame, the inventory bin having a linkage connected with the inventory bin;

using a mobile drive unit to move the frame and the inventory bin to another location within an inventory workspace; and actuating the linkage via an actuator included in the mobile drive unit to move one or more inventory items out of the inventory bin to a receiving inventory holder.

16. The method of claim 15, wherein actuating the linkage rotates the inventory bin relative to the frame about an axis.

17. The method of claim 15, further comprising lifting the frame by the mobile drive unit to align the inventory bin with a receiving inventory bin of the receiving inventory holder.

18. The method of claim 15, further comprising lifting the receiving inventory holder to align the inventory bin with a receiving inventory bin of the receiving inventory holder configured to receive the one or more inventory items from the inventory bin.

19. The method of claim 15, further comprising using a mobile drive unit to move the receiving inventory holder to another location within the inventory workspace after moving the one or more inventory items out of the inventory bin to the receiving inventory holder.

20. The method of claim 15, wherein actuating the linkage tilts the inventory bin relative to the frame, the method further comprising actuating a second linkage via an actuator included in a second mobile drive unit to tilt a receiving inventory bin of the receiving inventory holder into alignment with the inventory bin as tilted via the actuation of the linkage.

* * * * *